United States Patent [19]

Bernardoni et al.

[11] Patent Number: 4,519,363
[45] Date of Patent: May 28, 1985

[54] INTAKE SYSTEM FOR AN INTERNAL COMBUSTION ENGINE PROVIDED WITH SEVERAL INTAKE VALVES

[75] Inventors: Luigi Bernardoni, Tradate-Varese; Domenico D'Angelo, Monza-Milan, both of Italy

[73] Assignee: Alfa Romeo Auto S.p.A., Napoli, Italy

[21] Appl. No.: 571,663

[22] Filed: Jan. 17, 1984

[30] Foreign Application Priority Data

Feb. 2, 1983 [IT] Italy .................. 19397 A/83

[51] Int. Cl.³ .................. F02M 25/06; F02B 27/00
[52] U.S. Cl. .................. 123/432; 123/52 MB; 123/52 MF

[58] Field of Search .................. 123/432, 308, 52 MB, 123/52 MF

[56] References Cited

U.S. PATENT DOCUMENTS 4,231,329  11/1980  Ishida .................. 123/548
4,351,298   9/1982  Franke .................. 123/432

Primary Examiner—E. Rollins Cross
Attorney, Agent, or Firm—Charles A. Brown; Charles E. Brown

[57] ABSTRACT

In a multi-cylinder engine provided with several intake valves per cylinder and with the relative intake ducts, non-return valve means are provided in one of the intake ducts of each cylinder, in series with the respective intake valve.

4 Claims, 2 Drawing Figures

INTAKE SYSTEM FOR AN INTERNAL COMBUSTION ENGINE PROVIDED WITH SEVERAL INTAKE VALVES

Internal combustion engines provided with several intake valves per cylinder are characterised, for equal conditions, by higher specific powers than those obtainable by engines provided with single intake valves, because they allow operation with greater effective inductions, and therefore attain higher cylinder fillings and corresponding volumetric efficiencies, especially at high speeds.

With engines of this type, it is also possible to improve the cylinder filling by using different contours and timings for the cams which control the individual cylinder intake valves, because each contour can be optimized for a determined range of engine operation. In particular, in the case of two intake valves per cylinder, the contours of the two cams which control them can be chosen in such a manner that one enables effective cylinder filling at low speeds to be obtained, while the other is able to optimise it at high speeds.

For example, a cam in which one opening period is greater than the other, with larger opening advance and closure delay angles, improves filling at high speeds because it favours cylinder scavenging during cross-over with the exhaust valve, and utilises the inertia and resonance phenomena present in the column of air or mixture which enters the cylinder.

In contrast, a cam having a shorter opening period is effective at low speeds because it prevents backward flow of burnt gases to the intake side during cross-over with the exhaust valve, and prevents the drawing cylinder from refusing fresh mixture at the beginning of the compression stroke.

However, such engines can also show a certain worsening of volumetric efficiency when they operate at low rotational speeds, with a large degree of opening of the throttle valve or valves for the intake air or mixture.

This is because under these conditions, part of the fresh feed can flow through the intake valve with the greater opening period, ie with a greater opening advance and greater closure delay, and into the relative intake duct due to the closure delay of said valve, it being pushed by the piston commencing the compression stroke, in the absence of inertia induction effects.

The object of the present invention is to obviate these filling losses by providing non-return valve means in the intake duct which feeds the valve with a larger opening period, said valve means allowing air or mixture to flow to the cylinder but preventing reverse flow from the intake duct to the outside.

By this method, the air or fresh mixture which is introduced into the cylinder through said intake valve enters said intake duct through said non-return valve means, which open during the intake stage of said cylinder when they are subjected to a determined pressure difference. In contrast, the fresh mixture, which at low engine speeds flows back from the cylinder into said intake duct due to the closure delay of said intake valve, is retained in said duct by said non-return valve means, which are closed because of the lack of said pressure difference necessary to cause them to open. Thus in said duct there forms between the non-return valve means and said intake valve a pocket of stagnant mixture which possesses a certain overpressure and is therefore able to flow into the cylinder at the beginning of the next intake stage, so increasing the density of the feed in the cylinder and favouring the expulsion of burnt gases during cross-over with the exhaust valve. This results in a sharp improvement in engine filling at low speeds.

Characteristics and advantages of the invention are illustrated hereinafter with reference to FIGS. 1 and 2, which show a preferred embodiment of said invention by way of non-limiting example.

Figure 1:
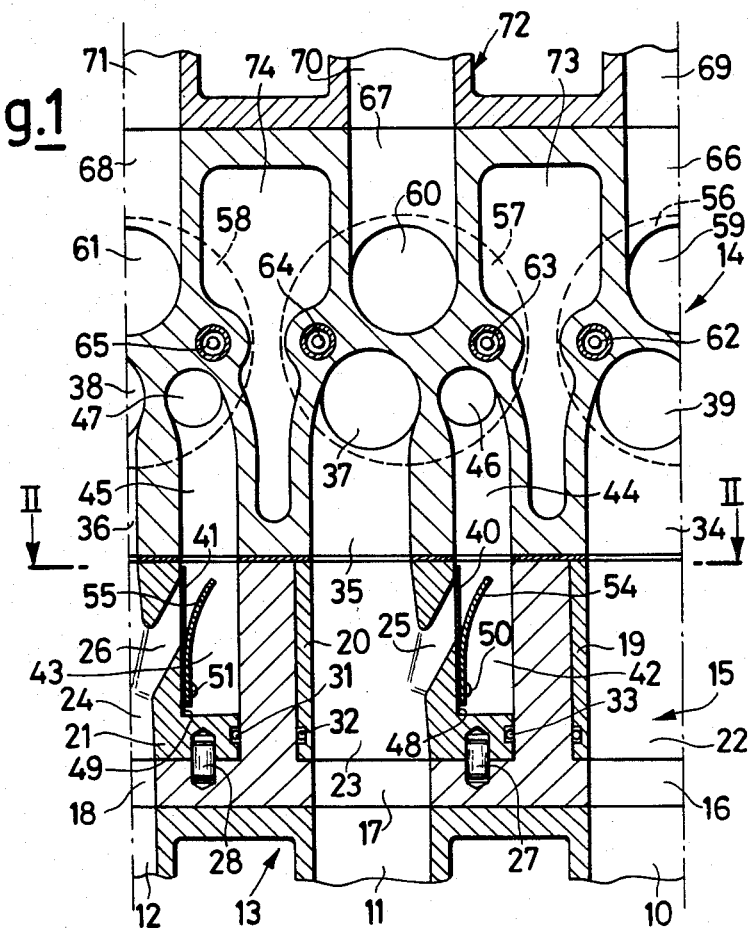
FIG. 1 is a partial section through the cylinder head of an engine provided with an intake system constructed in accordance with the invention.
Figure 2:
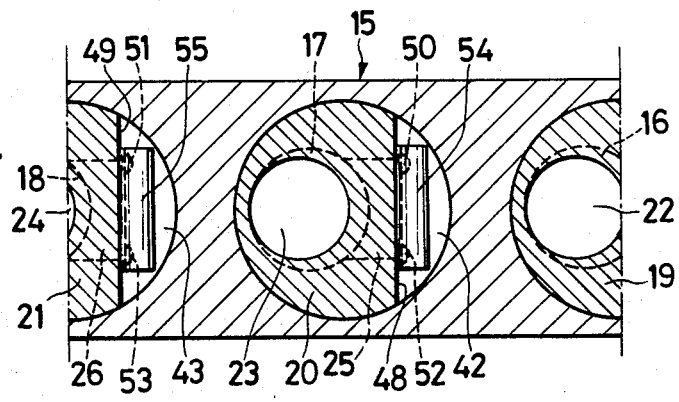
FIG. 2 is a section on the line II—II of FIG. 1.

In FIG. 1 the reference numerals 10, 11, 12 indicate three of the ducts of the intake manifold 13 of an in-line four cylinder engine, of which the cylinder head is indicated overall by 14. The ducts 10, 11, 12 are traversed by the air and petrol mixture or possibly by air alone, which feeds the engine. The figure does not show the throttle valve or valves, which are usually disposed upstream of the ducts 10, 11, 12 or in said ducts in order to adjust the engine feed.

In the figure, the reference numeral 15 indicates overall a connection block disposed between the manifold 13 and cylinder head 14, and provided with ducts 16, 17, 18, coaxial with the ducts 10, 11, 12, and further carrying seats for housing the members 19, 20, 21 in which there are provided further ducts 22, 23, 24 together with 25, 26 which branch from the former. The reference numerals 27, 28 indicate pegs for locking the members 19, 20 in the block 15, and the interposed seal rings are indicated by 31, 32, 33.

The ducts 22, 23, 24 connect to the ducts 34, 35, 36 which are formed in the head 14 and are provided with the intake valves 37, 38, 39. The branch ducts 25 and 26 open by way of non-return flap valves 40 and 41 into the channels 42 and 43, which themselves connect to the ducts 44 and 45, which are formed in the cylinder head and are provided with the intake valves 46 and 47.

The non-return valves 40 and 41 are constituted by preloaded flexible foils fixed to the walls 48 and 49 of the members 20 and 21 by means of the clinched pins 50, 51, 52, 53 by way of the arcuate tongues 54 and 55, which act as limit stops for said foils. FIG. 1 shows with dashed lines the perimeter of the explosion chambers 56, 57, 58 provided in the engine cylinder head 14. The reference numerals 59, 60, 61 indicate the cylinder exhaust valves, and 62, 63, 64, 65 the spark plugs, two per cylinder. The reference numerals 66, 67, 68 indicate the exhaust ducts provided in the cylinder head, which lead into the ducts 69, 70, 71 of the exhaust manifold 72. Finally, in FIG. 1 the reference numerals 73 and 74 indicate the cavities for the cylinder head cooling water.

In this particular case, each cylinder is provided with two intake valves of different sizes, namely a smaller valve such as 46 and 47, and a larger valve such as 37 and 38, in order to increase the velocity of the fluid stream passing through one valve, namely the smaller valve, to obtain a turbulence effect which makes the air and petrol mixture entering the cylinder more homogeneous and improves combustion Moreover, the larger valves 37, 38, 39 are operated by cams having opening angles smaller than those of the cams which operate the smaller valves 46 and 47. These latter therefore operate with larger opening advance and closure delay angles, which helps to improve filling at high loads, whereas the former operate with smaller opening advance and closure delay angles, suitable for preventing filling losses at low loads.

Furthermore, according to the invention, the intake branch ducts such as 25 and 26 are provided with non-return foil-type valves such as 40 and 41, which allow air or mixture entry to the ducts 44 and 45 during the intake stages of the respective cylinders, when a pressure difference arises across the foils 40 and 41 sufficient to overcome their preload and to lift them until they rest against the arcuate tongues 54 and 55.

However, when said pressure difference falls below the value necessary to overcome the preload, the foils 40 and 41 close the ducts 44 and 45, and thus the mixture, which because of the large closure delay angles of the valves 46 and 47 is able to flow back from the cylinders into the intake ducts 44 and 45 when the engine operates at low rotational speed with large openings of the throttle valve or valves, is retained in said ducts 44 and 45 and is prevented from flowing towards the intake ducts 10, 11, 12. Thus in the ducts 44 and 45 a pocket of stagnant mixture forms which possesses a certain overpressure and is therefore able to flow into the relative cylinder at the commencement of the next intake stage, thus increasing the density of the fresh feed and favouring the expulsion of the burnt gases, with a scavenging effect, during cross-over with the exhaust valves 59, 60, 61. A considerable improvement in engine filling at low speeds is thus obtained. As can be seen from FIG. 1, the non-return valves 40 and 41 are disposed upstream of the intake ducts provided in the engine cylinder head 14, and are therefore at a sufficient distance from the intake valves to protect them from the thermal stresses due to any backward flow of exhaust gas into the intake ducts.

We claim:

1. An intake system for a multi-cylinder internal combustion engine of the type comprising plural intake ducts and plural engine actuated intake valves for each cylinder, each engine actuated intake valve being arranged in a respective one of said plural intake ducts, and further comprising a non-return valve for each cylinder arranged inside one of said plural intake ducts of each cylinder in series with the respective one of said engine actuated intake valves, said non-return valve being arranged to allow fluid flow towards the respective cylinder and to prevent fluid flow from said one of said plural intake ducts to the outside.

2. An intake system as claimed in claim 1, wherein one of said plural engine actuated intake valves of each cylinder has a longer opening period than the other of said plural engine actuated intake valves of each cylinder and said non-return valve is arranged in that of said plural intake ducts of each cylinder which is associated with said one of said plural engine actuated intake valves.

3. An intake system as claimed in claim 1, wherein one of said plural engine actuated intake valves of each cylinder has a smaller passage cross-section than the other of said plural engine actuated intake valves of each cylinder and said non-return valve is arranged in that of said plural intake ducts of each cylinder which is associated with said one of said plural engine actuated intake valves.

4. An intake system as claimed in claim 1, wherein said non-return valves of each plurality of intake ducts are arranged in a connection block interposed between a cylinder head and a cylinder intake manifold block of the engine.

* * * * *